M. P. HOLMES.
CLUTCH CONTROLLING MECHANISM.
APPLICATION FILED MAY 29, 1916.
1,430,520.
Patented Sept. 26, 1922.
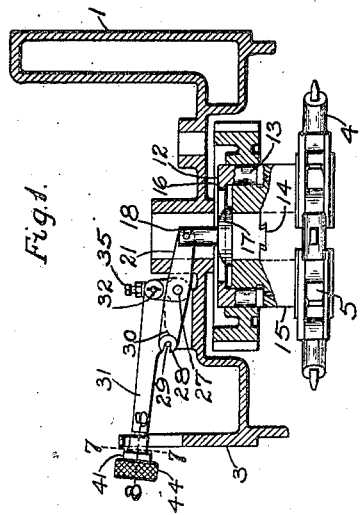
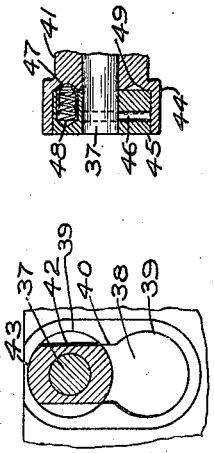
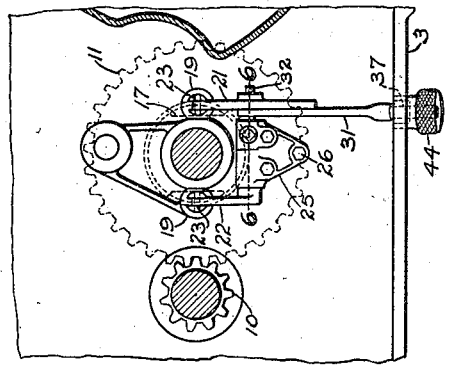
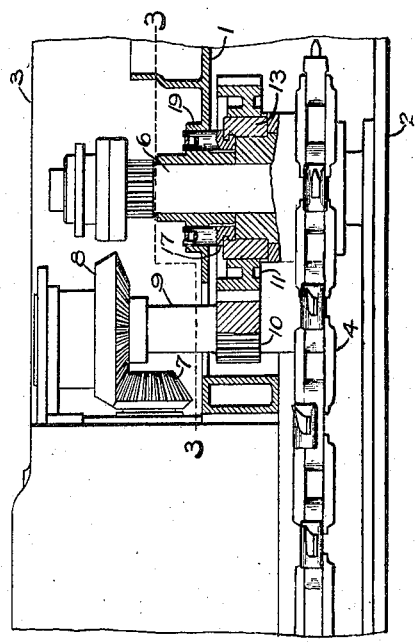
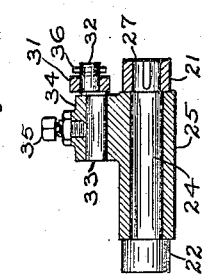
Inventor
Morris P. Holmes
By
Atty.

Patented Sept. 26, 1922.

1,430,520

UNITED STATES PATENT OFFICE.

MORRIS P. HOLMES, OF CLAREMONT, NEW HAMPSHIRE, ASSIGNOR, BY MESNE ASSIGNMENTS, TO THE JEFFREY MANUFACTURING COMPANY, OF COLUMBUS, OHIO, A CORPORATION OF OHIO.

CLUTCH-CONTROLLING MECHANISM.

Application filed May 29, 1916. Serial No. 100,715.

*To all whom it may concern:*

Be it known that I, MORRIS P. HOLMES, a citizen of the United States, residing at Claremont, in the county of Sullivan and State of New Hampshire, have invented certain new and useful Improvements in Clutch Controlling Mechanisms, of which the following is a full, clear, and exact specification.

My invention relates to clutch controlling mechanisms.

It has for its object to provide an improved clutch controlling mechanism. More specifically, my invention has for its object to produce an improved clutch controlling mechanism which is of a compact and rugged construction, and adapted to be conveniently adjusted to and securely held in any desired position of adjustment. A still further and more specific object of my invention is to provide an improved clutch controlling mechanism especially adapted to use in the control of the main or other clutch of a mining machine, whereby said clutch may be readily and quickly actuated and wherein the clutch controlling mechanism is so compact in construction as to render it well adapted to use on such a machine. These and other objects of my improvement will hereinafter appear.

In the accompanying drawings, I have for purposes of illustration shown one embodiment which my invention may assume in practice, the same being illustrated in connection with a mining machine.

In these drawings :—

Figure 1 is a partial transverse sectional view of a mining machine equipped with my improvement.

Figure 2 is a partial longitudinal sectional view of the machine.

Figure 3 is a partial horizontal sectional view taken on line 3—3 of Figure 2.

Figure 4 is a detail view of one of the clutch members.

Figure 5 is a detail view of the cooperating clutch member.

Figure 6 is a detail view taken on line 6—6 of Figure 3.

Figure 7 is an enlarged detail view taken on line 7—7 of Figure 1.

Figure 8 is a detail sectional view taken on line 8—8 of Figure 1.

In these drawings I have illustrated a mining machine of standard construction including a frame 1 mounted on a shoe 2 and enclosed in a suitable casing 3. As shown, a cutter chain 4 has its inner end mounted upon a sprocket 5, which is in turn carried on an upright shaft 6 suitably mounted on the machine bottom or shoe 2 and journaled in the frame 1. This shaft, as in the usual manner, derives its power from a motor (not shown) which rotates a bevel gear 7, (Fig. 2) the latter in turn driving a cooperating bevel gear 8 carried on a vertical shaft 9 likewise journaled in the frame and preferably disposed at a point between the motor and the shaft 6. This shaft 9 also carries at its lower end a cooperating gear 10 which meshes with a gear 11 carried on the shaft 6. Disposed within this gear is a vertically movable ring-like clutch member 12 having a plurality of depending pins 13 (Fig. 4) thereon adapted to be moved into and out of locking engagement with correspondingly shaped notches 14 (Fig. 5) preferably formed in a sleeve 15 integral with the chain sprocket 5. As shown, this member 12 is also preferably provided with a flanged upper end 16 overlapping a plurality of flanged lifters 17 (Figs. 2 and 3) disposed on opposite sides of the shaft 6 and carried on pins 18 reciprocably mounted in suitable guide-ways 19 formed upon the upper portion of the frame. The construction so far referred to, except as hereinafter pointed out, is of a well-known type and has long been used in the mining machine art, the particular clutch mechanism illustrated, for example, being more fully shown and described in Letters Patent Nos. 1,185,275 and 1,185,277, granted May 30, 1916, to Albert Ball.

My invention includes improved means for actuating the clutch mechanism and, although it is herein described as used in connection with a clutch of the standard construction mentioned, it is of course not limited to use in that connection and may be readily adapted to use in connection with clutches of other types. As shown, it includes a plurality of laterally spaced parallel arms 21, 22 pivotally connected by means of a suitable slot and pin connection 23 to the upper ends of the members 18. One of these arms 22 is preferably formed integral with or is rigidly attached to one end of a horizontal shaft 24 (Fig. 6) disposed at right angles to and adjacent the shaft 6, the shaft 24 being preferably journaled in a bracket 25 which is carried on the frame and preferably attached thereto as, for instance, by suitable bolts 26. The other arm 21 is rigidly connected at 27 to the opposite end of the shaft 24, and extends beyond the same, being provided at its extremity with a longitudinally disposed slot or socket 28, slidably receiving a pin 29 carried on a depending portion 30 on an upper or main clutch operating lever 31. This lever 31 is in turn pivoted at its inner end on an eccentric pin or cam 32 carried on a short shaft 33 disposed above the shaft 24 and adjustably mounted in a suitable bearing formed on an extension 34 of the bracket 25, the shaft 33 being held in any desired position of adjustment by a set-screw 35. As shown, the arm 31 is held in position with respect to the eccentric pin by means of a cotter pin or other suitable holding means 36.

This main operating lever or arm 31 extends laterally from its point of connection to the eccentric 32 through the side wall of the casing 3 in such a manner as to be operable from the exterior thereof. As shown, it preferably has a reduced portion 37 which projects through a suitable aperture 38 in that wall. This aperture 38, as shown, is preferably vertically disposed and provided with rounded ends 39 and a slotted communicating or middle portion 40, so that it may cooperate with a suitable rotatable knob carried on the reduced end 37 of the lever 31. This knob, as shown, is also provided with a sleeve portion 41 which receives the reduced end of the lever 31 and is rotatable thereon, the sleeve 41 preferably having oppositely located flattened sides 42 and curved sides 43, so that after suitable rotation it may be made to lock or unlock the lever 31 in either end of the aperture 38, and may pass readily from one end to the other of said aperture. As shown, the knob is also preferably provided with a milled gripping surface 44 so that it may be readily rotated, and houses within the same a block 45 which is fixed to the lever end 37 by a pin 46, the knob being held in any desired position of adjustment with respect to the member 45 by means of a plunger 47 seated in that member and normally pressed outward by a spring 48 into engagement with one of a plurality of recesses 49 formed in the knob.

In the operation of my improved construction, an operator desiring to connect or disconnect the clutch members 13 and 14 and thereby change the connection of the cutter chain 4 with the transmission mechanism connected with the motor, may readily do so by simply rotating the knurled end 44 of the locking member and lifting or depressing the latter and thereby the clutch controlling member 31. Obviously, the knob will be readily released by a short turning movement of the same, so that it may pass through the reduced slotted portion 40 from one end of the aperture 38 to the other, and then may be readily locked in position by a turning movement sufficient to bring its flat surfaces around to a position out of registry with the slotted portion 40. In all positions of this member 44, it will of course be held by the spring 48 and plunger 47. In the operation of the device, it will be noted that when it is desired to adjust the clutch mechanism as, for instance, to accommodate clutch members 13 and 14, having slight variations of construction, or when wear takes place, it is only necessary to release and rotate the shaft 33 and thereby the eccentric 32 in such a manner as to vary the movement of the member 21 and adapt it to the given condition, the eccentric being then readily and securely reclamped by readjustment of the released set-screw 35. Attention is also directed to the fact that this adjustment may take place without substantially varying the throw of the free end of the member 31, or in any way interfering with the locking means therefor.

It will be noted that in my improved construction the operating lever of the clutch mechanism is required to be moved through only a very small arc, thereby enabling the clutch to be shifted very quickly from one position to the other without requiring such a large movement as would cause conflict between the clutch lever and the feed chain or cable which in certain types of mining machines extends along the outside of the machine. It will also be noted that due to my improved operating and locking means, the clutch mechanism may be readily operated whenever desired and locked or unlocked in its various positions of adjustment by a simple rotation of the locking member in the operator's hands. Attention should also be directed to the fact that due to my improved construction only a very small opening in the outer casing of the machine is necessary, the amount of dust which may enter the machine being thereby reduced. It will also be noted that, while the protruding operating knob need not extend laterally more than a few inches, thereby minimizing the width of the machine and the danger of an operator's clothes catching on the same, the same is of such a construction as to insure a very satisfactory grasp. These and other advantages of my improved construction will, however, be clearly apparent to those skilled in the art.

While I have in this application specifically described one embodiment which my invention may assume in practice, it is to be understood that this embodiment is used for purposes of illustration and that the invention is not limited to use in connection therewith but may be embodied in various other forms, all of which it is my intention to include within the scope of the appended claims.

What I claim as new and desire to secure by Letters Patent is:

1. In a clutch controlling mechanism, clutch mechanism including a movable clutch member, an operating lever, a cooperating clutch controlling lever pivotally connected to said clutch member, pivotal operative connections between said levers, and means whereby the angle of one of said levers may be adjusted without substantially varying the throw of the free end of the other.

2. In a clutch controlling mechanism, a clutch mechanism including a movable clutch member, a pivoted operating lever, a cooperating pivoted clutch controlling lever pivoted at opposite sides of its pivot to said clutch member and said operating lever, and means for adjusting the angle of said cooperating member.

3. In a clutch controlling mechanism, clutch mechanism including a movable clutch member, an operating lever, a cooperating clutch controlling lever connected to said clutch member, pivotal operative connections between said levers, and means whereby the position of one of said levers may be adjusted without substantially varying the throw of the free end of the other lever.

4. In a clutch controlling mechanism, clutch mechanism including a movable clutch member, an operating lever, a cooperating clutch controlling lever connected to said clutch member, pivotal operative connections between said levers, and means whereby the position of said last mentioned lever may be adjusted without substantially varying the throw of the free end of said first mentioned lever.

5. In a clutch controlling mechanism, clutch mechanism including a movable clutch member, an operating lever, a cooperating clutch controlling lever pivoted adjacent the pivot of said operating lever, pivotal connections whereby said levers may be moved together, and means whereby the position of one of said levers may be adjusted without substantially varying the throw of the free end of its fellow.

6. In a clutch controlling mechanism, clutch mechanism including a movable clutch member, a pivoted operating lever having a limited range of movement, a cooperating pivotally mounted lever disposed substantially parallel thereto and operatively connected at one end to said clutch member and at its opposite end to said operating lever at a point on the opposite side of the pivot thereof, and means for adjusting the range of movement of said cooperating lever.

7. In a clutch controlling mechanism, clutch mechanism including a movable clutch member, a pivoted operating lever, a cooperating clutch controlling lever having one end extending beyond the pivot of said operating lever and its opposite end extending to a point intermediate the ends of the latter, and operative connections between said levers including means for varying the position of the cooperating lever without substantially varying the throw of the free end of the operating lever.

8. In a clutch controlling mechanism, clutch mechanism including a movable clutch member, a pivoted operating lever having a lateral extension disposed at one side of its pivot and adjacent its free end, a cooperating clutch controlling member pivoted adjacent the pivot of said operating member and disposed substantially parallel thereto, operative connections between said levers operatively connected to said extension, and a single means adjustable to vary the position of said cooperating lever without substantially affecting the throw of the free end of said operating lever.

9. In a clutch controlling mechanism, a support, clutch mechanism thereon including a movable clutch member, an adjustable cam member on said support, an operating lever pivoted on said cam member, and a cooperating pivotally mounted lever pivotally connected at one end to said clutch member and at its opposite end to said operating lever at a point at one side of its pivotal connection to said cam.

10. In a clutch controlling mechanism, a support, clutch mechanism thereon including a movable clutch member, an adjustable eccentric carried on said support, an operating lever pivotally connected to said eccentric, and a cooperating lever pivotally mounted on said support at a point, beneath said eccentric and having one end connected to said clutch member and its opposite end connected to said operating lever at a point between its ends.

11. In a clutch controlling mechanism, a support, clutch mechanism including a movable clutch member carried on said support, a shaft journaled on said support, arms fixed to the opposite ends of said shaft and pivotally connected to said movable clutch member, an eccentric adjustably mounted on said support, and an operating lever pivotally mounted on said eccentric and pivotally connected to one of said arms at a point at one side of the connection of said operating lever to said eccentric.

12. In a clutch controlling mechanism, a frame having communicating apertures in its side wall, clutch mechanism carried by said frame including a movable clutch member, an operating lever pivoted on said frame and having a portion thereof extending through one of said apertures, operative connections between said operating lever and said clutch member, and a member carried on said portion of said lever and movable into or out of locking engagement with the walls of either aperture to lock or release said lever.

13. In a clutch controlling mechanism, a frame having communicating apertures in its side wall, clutch mechanism carried by said frame including a movable clutch member, an operating lever pivoted on said frame and having a portion thereof extending through one of said apertures, operative connections between said operating lever and said clutch member, and a member carried on said portion of said lever and locking the same in one aperture, said member being movable relative to said lever to permit the latter to enter the other aperture and thereafter movable relative to said lever to lock the same in said aperture.

14. In a clutch controlling mechanism, a casing having a plurality of communicating openings therein, clutch mechanism carried in said casing including a movable clutch member, clutch actuating mechanism operatively connected to said clutch member and including an operating member normally extending through one of said openings, means including a rotatable member carried on said operating member and movable relative thereto for locking the latter in position in either of said communicating openings, and means between said rotatable member and said operating member for holding the former in one of a plurality of positions of adjustment.

15. In a clutch controlling mechanism, a support, clutch mechanism carried thereon including a movable clutch member, an operating lever pivotally connected to said support at one end, a cooperating lever pivotally mounted on said support at a point intermediate its ends, said cooperating lever being pivoted to said clutch member at one end and pivoted at its opposite end to said operating lever at a point intermediate the ends of the latter, a casing enclosing said elements and having an aperture through which said operating lever extends, and a rotatable member carried on said lever and movable into locking engagement with the walls of said aperture in any one of a plurality of positions.

16. In combination, a frame, a driven member journaled on said frame, power transmission mechanism, clutch mechanism for controlling the connection of said driven member to said transmission mechanism, a casing enclosing said elements and having an aperture in its side wall, clutch controlling mechanism including a laterally extending adjustable lever having its end protruding through said aperture, and rotatable means carried on the protruding end of said lever movable to lock the latter in engagement with the walls of said aperture in one of a plurality of positions of said lever in said aperture.

17. In a clutch controlling mechanism, a frame having communicating apertures in a side wall, clutch mechanism carried by said frame including a movable clutch member, an operating lever pivoted on said frame and having a portion thereof extending through one of said apertures, a cooperating pivoted lever on said frame pivoted at opposite sides of its pivot to said clutch member and said operating lever, means whereby the angle between said levers may be adjusted without substantially varying the throw of said portion, and a member carried on said portion and movable into or out of locking engagement with the walls of either aperture to look or release said lever.

In testimony whereof I affix my signature.

MORRIS P. HOLMES.